(12) United States Patent
Zhang et al.

(10) Patent No.: US 8,201,232 B2
(45) Date of Patent: Jun. 12, 2012

(54) AUTHENTICATION, IDENTITY, AND SERVICE MANAGEMENT FOR COMPUTING AND COMMUNICATION SYSTEMS

(75) Inventors: Xinwen Zhang, San Jose, CA (US); Jean-Pierre Seifert, San Jose, CA (US); Onur Aciicmez, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 879 days.

(21) Appl. No.: 12/147,246

(22) Filed: Jun. 26, 2008

(65) Prior Publication Data

US 2009/0328141 A1   Dec. 31, 2009

(51) Int. Cl.
*H04L 29/06* (2006.01)
(52) U.S. Cl. .................... 726/7; 726/27; 380/270
(58) Field of Classification Search ............... 726/1–10, 726/17–21, 27–33; 713/168–172
See application file for complete search history.

(56) References Cited

U.S. PATENT DOCUMENTS

| | | | | |
|---|---|---|---|---|
| 2005/0044378 | A1* | 2/2005 | Beard et al. | 713/182 |
| 2006/0041746 | A1* | 2/2006 | Kirkup et al. | 713/168 |
| 2007/0017974 | A1* | 1/2007 | Joao | 235/380 |
| 2007/0038860 | A1* | 2/2007 | Sawada | 713/170 |
| 2009/0222900 | A1* | 9/2009 | Benaloh et al. | 726/9 |

OTHER PUBLICATIONS

Abe, Tsuyoshi; Itoh, Hiroki; Takahashi, Kenji: Implementing Identity Provider on Mobile Phone: Nov. 2, 2007: DIM'07: ACM 978-1-59593-889-3/07/0011: pp. 46-50.*
RSA—The Security Division of EMC, "RSA SecurID Token for Symbian OS and UIQ," http://www.rsa.com/node.aspx?id=3388, downloaded on Jul. 17, 2008, 1 page.
Sailer et al., "Design and Implementation of a TCG-based Integrity Measurement Architecture," Proceedings of the 13th USENIX Security Symposium, 2004, 17 pages.
Abe et al., "Implementing Identity Provider on Mobile Phone," Proc. of ACM Workshop on Digital Identity Management, 2007, 7 pages.
Jøsang et al., "User Centric Identity Management," Proceedings of AusCERT Conference, 2005, 13 pages.

(Continued)

*Primary Examiner* — Gilberto Barron, Jr.
*Assistant Examiner* — Malcolm Cribbs
(74) *Attorney, Agent, or Firm* — Beyer Law Group LLP (57) ABSTRACT

Improved techniques for obtaining authentication identifiers, authentication, and receiving services are disclosed. Multiple devices can be used for receiving service from a servicing entity (e.g., Service Providers). More particularly, a first device can be used to authenticate a first entity (e.g., one or more persons) for receiving services from the servicing entity, but the services can be received by a second device. Generally, the first device can be a device better suited, more preferred and/or more secure for authentication related activates including "Identity Management." The second device can be generally more preferred for receiving and/or using the services. In addition, a device can be designated for authentication of an entity. The device releases an authentication identifier only if the entity has effectively authorized its release, thereby allowing "User Centric" approaches to "Identity Management." A device can be designated for obtaining authentication identifiers from an identity assigning entity (e.g., an Identity Provider). The authentication identifiers can be used to authenticate an entity for receiving services from a servicing entity (e.g., a Service Provider) that provides the services to a second device. The same device can also be designated for authentication of the entity. The device can, for example, be a mobile phone allowing a mobile solution and providing a generally more secure computing environment than the device (e.g., a Personal Computer) used to receive and use the services.

45 Claims, 6 Drawing Sheets

OTHER PUBLICATIONS

Wikipedia—The Free Encyclopedia, "Conceptual schema," http://en.wikipedia.org/wiki/Conceptual_schema, downloaded on Jul. 17, 2008, 2 pages.
Wikipedia—The Free Encyclopedia, "Schema," http://en.wikipedia.org/wiki/Schema, downloaded on Jul. 17, 2008, 1 page.
Wikipedia—The Free Encyclopedia, "XML schema," http://en.wikipedia.org/wiki/XML_schema, downloaded on Jul. 17, 2008, 2 pages.
Wikipedia—The Free Encyclopedia, "XML Schema (W3C)," http://en.wikipedia.org/wiki/XML_Schema_(W3C), downloaded on Jul. 17, 2008, 4 pages.
David Chappell, "Introducing Windows CardSpace," http://msdn.microsoft.com/en-us/library/aa480189.aspx, downloaded on Jul. 17, 2008, 20 pages.

* cited by examiner

AUTHENTICATION, IDENTITY, AND SERVICE MANAGEMENT FOR COMPUTING AND COMMUNICATION SYSTEMS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known and an Operating System (OS) which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices, is evidenced by their ever increasing use in everyday life. Accordingly, improved techniques for managing their use would be useful.

SUMMARY OF THE INVENTION

Broadly speaking, the invention relates to computing and communication systems. More particularly, the invention pertains to authentication, identity and service management in computing and communication systems.

The invention, among other things, provides improved techniques for obtaining authentication identifiers, authentication, and receiving services from various servicing entities.

In accordance with one aspect of the invention, multiple devices can be used for receiving service from a servicing entity (e.g., a "Service Provider"). More particularly, a first device can be used to authenticate a first entity (e.g., one or more persons) for receiving services from a servicing entity, but the services can be received by a second device. In other words, a device can be designated for authentication of an entity for receiving services that can be received on another device. Generally, the first device can be a device better suited, more preferred and/or more secure for authentication related activates including "Identity Management." The second device can be generally more preferred for receiving and/or using the services. By way of example, the first device can be a mobile device, a device that offers better protection for storing authentication identifiers, and/or a device that is generally more secure than the second device. On the other hand, the second device can be a device that is better suited and/or more preferred for receiving and/or using services. As such, the first device can, for example, be a mobile device (e.g., a specialized mobile computing device, a Smartphone, a cell phone) and the second device can, for example, be a general purpose computing device (e.g., a Personal Computer). Generally, the first device can use a secure mechanism to store and provide an authentication identifier to a serving device. By way of example, the first device can use a secure connection via the second device, encryption techniques, and/or a direct connection (e.g., a connection not made through the second device).

In accordance with another aspect of the invention, a device is designated for authentication an entity and releases an authentication identifier only if the entity has effectively authorized its release, thereby allowing "User Centric" identity schemes to be effectively provided. In one embodiment, a device is operable to obtain an indication of a request to authenticate a first entity after the request has been effectively initiated by a servicing device and issued to a second device. The device can also determine whether to effectively provide the one or more authentication identifiers to a servicing device for authentication of the first entity in response to the request for authentication. By way of example, the device can be operable to receive input from a person and/or use authorization data sorted for the person indicative of general, implicit, specific and/or explicit authorization (or willingness) of the release of an authentication identifier. The device can also be operable to effectively provide said one or more authentication identifiers to a servicing device, thereby allowing the servicing device to authenticate the first entity based on the authentication identifiers stored on the device even though the request to authenticate the first entity was issued to a second device. It should be noted that the authentication identifiers can be securely stored on the device and need not be stored on the second device operable to receive and/or use the services.

In accordance with yet another aspect of the invention, a device can be designated for obtaining authentication identifiers from an identity assigning entity (e.g., an "Identity Provider"). The authentication identifiers can be used to authenticate an entity for receiving services from a servicing entity (e.g., a Service Provider) that provides the services to a second device. The device can also be designated for authentication of the entity. In one embodiment, a device is operable to obtain one or more authentication identifiers from an identity assigning entity, store and provide the one or more authentication identifiers to a serving device for authentication of an entity.

The invention can be implemented in numerous ways, including, for example, a method, an apparatus, a computer readable medium, and a computing system (e.g., a computing device). A computer readable medium can, for example, include at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, communication and computing systems are becoming increasingly more popular. Today, wireless networks and mobile communication devices (e.g., Smartphones, cell phones, Personal Digital Assistants) are especially popular. More generally, numerous types of computing devices are widely in use. However, security of computing, communication and by in large electronic devices is a major concern today. As generally known in the art, "Authentication" and "Identity Management" are important aspects of various communication and computing systems that are in existence today. In computer security, authentication can, for example, include the process of attempting to verify the digital identity of a sender of a communication, such as a request to login and/or request for services. The sender being authenticated may, for example, be a person using a computer, a computer itself, or a computer program.

Identity Management (or identity management system) can, for example, include management of an identity (or life cycle of the identity) of entities (subjects or objects). As such, Identity Management can, for example, include establishing an identity by linking a name (or number) with a subject, or by the object re-establishing the identity (e.g., linking a new or additional name, or number, with the subject or object). Identity Management can also include describing the identity by optionally assigning one or more attributes applicable to the particular subject or object to the identity, or re-describing the identity (i.e. changing one or more attributes applicable to the particular subject or object), and destroying the identity.

Several interpretations of Identity Management (IM) (also known as IdM) have been developed in the Information Technology (IT) industry. In Computer science, Identity Management can refer to management of user credentials and the mechanism by which users might log on to an online system to access data and/or receive services. From a service paradigm perspective, where organizations evolve their systems to the world of converged services, the scope of identity management can becomes much larger, and its application can become even more critical. The scope of Identity Management can include all the resources of the company deployed to deliver online services. These may include devices, network equipment, servers, portals, content, applications and/or products as well as a user credentials, address books, preferences, entitlements and telephone numbers.

Today, goods and services can be purchased in various digital and physical forms using computing and communication devices, or more generally electronic devices. In electronic commerce, commonly known as "e-commerce" or "eCommerce," products and services can be bought, sold, and/or donated over electronic systems, such as the Internet, and other computer networks. The amount of trade conducted electronically has grown extraordinarily since the spread of the Internet. However, security concerns and Identity Management present serious challenges to further development of e-commerce as can be generally appreciated by any one who has been subject to identify theft and/or has been frustrated by the growing number of credentials (e.g., accounts with various merchants) needed to buy goods and services from numerous venders. Furthermore, privacy is a major concern. Generally, users prefer to control the release of their own identify information, including their personal credentials (e.g., credit card numbers, social security numbers). In other words, "User-Centric Identity Management," as generally known in the art, is desirable for at least some applications.

In view of the foregoing, improved techniques for authentication, identity and service management would be useful for e-commerce. More generally, improved techniques for authentication, identity and service management would be useful for computing and communication systems, partly because security and privacy concerns and a need for Identity Management.

As such, it will be appreciated that the invention pertains to improved techniques for authentication, identity and service management in computing and communication systems. The invention, among other things, provides improved techniques for obtaining authentication identifiers, authentication, and receiving services from various servicing entities.

In accordance with one aspect of the invention, multiple devices can be used for receiving service from a servicing entity (e.g., a "Service Provider"). More particularly, a first device can be used to authenticate a first entity (e.g., one or more persons) for receiving services from a servicing entity, but the services can be received by a second device. In other words, a device can be designated for authentication of an entity for receiving services that can be received on another device. Generally, the first device can be a device better suited, more preferred and/or more secure for authentication related activates including "Identity Management." The second device can be generally more preferred for receiving and/or using the services. By way of example, the first device can be a mobile device, a device that offers better protection for storing authentication identifiers, and/or a device that is generally more secure than the second device. On the other hand, the second device can be a device that is better suited and/or more preferred for receiving and/or using services. As such, the first device can, for example, be a mobile device (e.g., a specialized mobile computing device, a Smartphone, a cell phone) and the second device can, for example, be a general purpose computing device (e.g., a Personal Computer). Generally, the first device can use a secure mechanism to store and provide an authentication identifier to a serving device. By way of example, the first device can use a secure connection via the second device, encryption techniques, and/or a direct connection (e.g., a connection not made through the second device).

In accordance with another aspect of the invention, a device is designated for authentication an entity and releases an authentication identifier only if the entity has effectively authorized its release, thereby allowing "User Centric" identity schemes to be effectively provided. In one embodiment, a device is operable to obtain an indication of a request to authenticate a first entity after the request has been effectively initiated by a servicing device and issued to a second device. The device can also determine whether to effectively provide the one or more authentication identifiers to a servicing device for authentication of the first entity in response to the request for authentication. By way of example, the device can be operable to receive input from a person and/or use authorization data sorted for the person indicative of general, implicit, specific and/or explicit authorization (or willingness) of the release of an authentication identifier. The device can also be operable to effectively provide said one or more authentication identifiers to a servicing device, thereby allowing the servicing device to authenticate the first entity based on the authentication identifiers stored on the device even though the request to authenticate the first entity was issued to a second device. It should be noted that the authentication identifiers can be securely stored on the device and need not be stored on the second device operable to receive and/or use the services.

In accordance with yet another aspect of the invention, a device can be designated for obtaining authentication identifiers from an identity assigning entity (e.g., an "Identity Provider"). The authentication identifiers can be used to authenticate an entity for receiving services from a servicing entity (e.g., a Service Provider) that provides the services to a second device. The device can also be designated for authentication of the entity. In one embodiment, a device is operable to obtain one or more authentication identifiers from an identity assigning entity, store and provide the one or more authentication identifiers to a serving device for authentication of an entity.

Embodiments of these aspects of the invention are discussed below with reference to FIGS. 1A-2C. However, those skilled in the art will readily appreciate that the detailed description given herein with respect to these figures is for explanatory purposes as the invention extends beyond these limited embodiments.

Figure 1A:
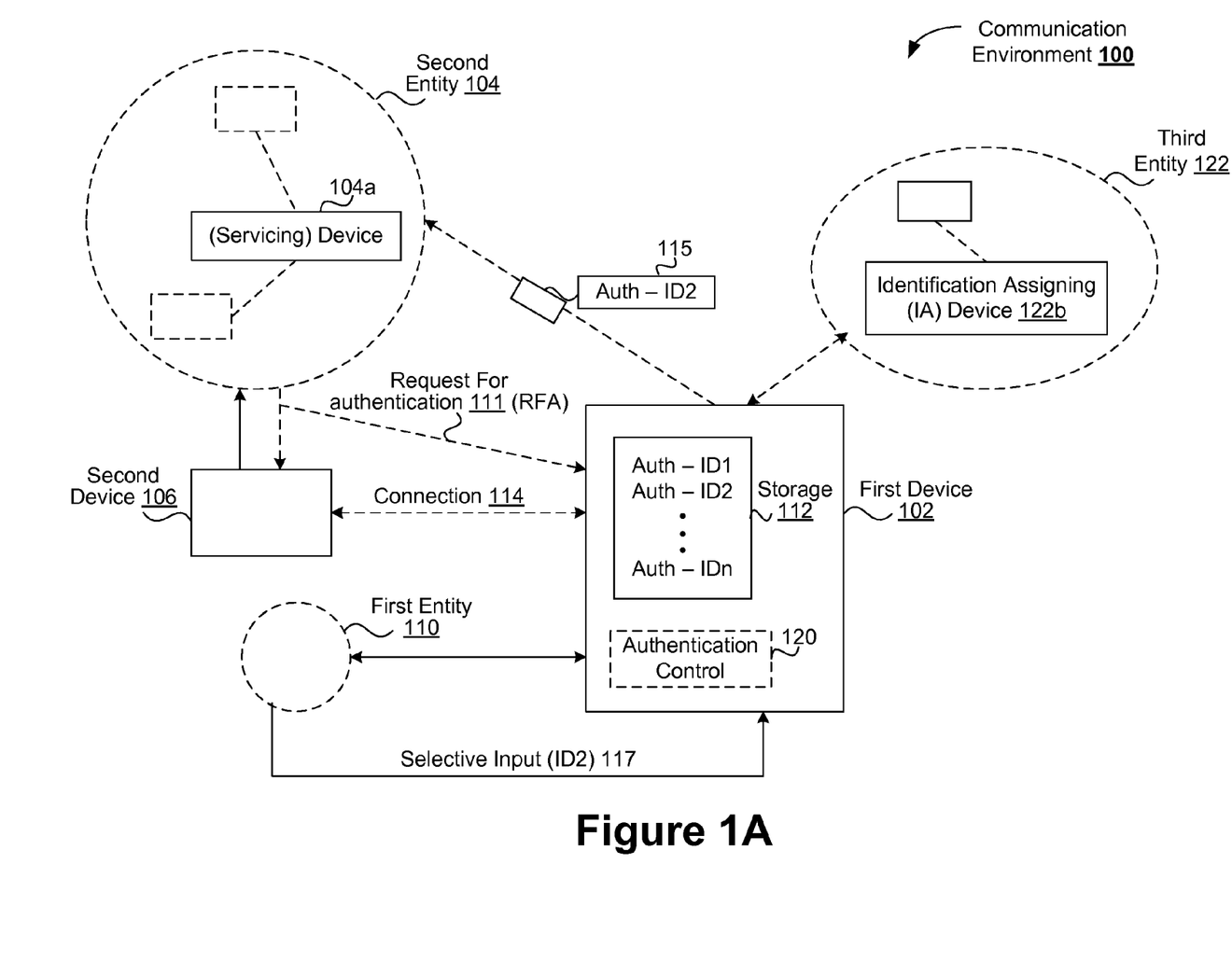
FIG. 1A depicts a communication environment in accordance with one embodiment of the invention.

FIG. 1A depicts a communication environment 100 in accordance with one embodiment of the invention. Referring to FIG. 1A, a first device 102 can be operable to independently control and/or complete an authentication process. Generally, an authentication process can be required for accessing a second entity 104 and/or one or more devices associated with the second entity 104. The authentication process can, for example, authenticate a first entity 110 for receiving services from a second entity 104. It will be appreciated that the services offered by the second entity 104 can be received by a second device 106 after authenticating the first entity 110 using the first device 102. In addition, the second device 106 can effectively initiate the request for receiving the services from the second entity 104. As such, the communication environment 100 depicts an environment where multiple devices, namely, first and second devices 102 and 106 can be used to access a second entity 104 for various reasons.

As noted above, the first device 102 can be operable to independently control and/or complete an authentication process for accessing the second entity 102 (e.g., receiving services from the second entity 104). More particularly, the first device 102 can be operable to obtain one or more authentication identifiers (Auth-ID's) for a first entity 110 and store them in the storage 112. The one or more authentication identifiers stored on the first device 102 can be used to effectively authenticate the first entity 110 (e.g., a person, a company, an organization). Typically, the first entity 110 is authenticated in response to a request for service (or service request) from a servicing device 104a associated with the second entity 104. The servicing device 104a can be owned and/or controlled by the second entity 104, and as such, it can effectively represent the second entity 102. By way of example, the serving device 104a can be a server representing a service provider offering goods and/or services.

It should be noted that a request for service can be initiated on the second device 106. However, the first device 102 can be operable to effectively obtain the request for authentication and/or an indication of the request for authentication (RFA) 111 in order to effectively authenticate the first entity 110 using the first device 102. The request for authentication and/or an indication of it (111) can, for example, be directly provided to the first device 102 and/or provided via a connection 114 to the second device 106. By way of example, the first device 102 can be operable to effectively obtain the request for authentication by using an address (e.g., receive as input a Universal Resource Link as an address to a request for authentication and/or receive and address or other data pertaining to the request for authentication via the connection 114). Generally, a request for authentication (RFA) 111 can effectively identify or request an authentication identifier. As such, based on the request for authentication, the first device can determine that the second entity 104 is requesting one or more authentication identifiers to authenticate the first entity 110. In any case, in response to the request for authentication (RFA) 111, the first device 102 can be operable to effectively provide one or more of the authentication identifiers stored in the storage 112 to the second entity 104. An authentication identifier 115 can, for example, be provided to the second entity 104 by directly transmitting it via the first device 102 and/or via the connection 114 through the second device 106.

It will be appreciated that the first device 102 can be operable to determine whether to effectively provide an authentication identifier to the second entity 104 or not to provide it. In other words, the first device 102 can be operable to effectively release an authentication identifier based on the willingness (or authorization) of the first entity to release the authentication identifier. Referring to FIG. 1A, the first device 102 can, for example, be operable to receive selective input 112 from the first entity (e.g., a person) to determine whether to release an authentication identifier 115 or not release it to the second entity 104. Generally, it will be appreciated that the first device 102 can effectively provide an authentication control 120 which can serve to give the first entity effective control over the release of authentication identifiers stored in the storage 112. As such, those skilled in the art will appreciate that the first device 102 can effectively provide a User Centric Identity Management mechanism, allowing users to have control over the release of their identity.

It will also be appreciated that the first device 102 can be a portable device, thereby allowing a portable solution for managing identity, as generally known in the art as "Identity Management". In addition, the first device 102 can be a relatively safer device than the device 106, thereby allowing the authentication identifiers to be better protected than they would be if stored on the second device 106. The second device 106 can be generally less secure and/or better suited than the first device 102 for receiving and/or using the services offered by the second entity 104. By way of example, the second device 106 can be a general purpose Personal Computer (PC) supporting a variety of applications (e.g., a media player) and providing storage for storing data received from the second entity 104 (e.g., a digital movie). The first device 102 can, for example, be a mobile cell phone providing an inherently safer computing environment (e.g., a trusted computing environment) than the Personal Computer.

In any case, the first device 102 can be operable to store one or more authentication identifiers securely in the storage 112. By way of example, the storage 112 can be a secure storage and/or authentication identifier can be stored in an encrypted form. It should be noted that the one or more authentication identifiers can, for example, be obtained from a third entity 122 or the second entity 104. By way of example, the one or more authentication identifiers can be obtained from an identification assigning device 122b representing an identification assigning entity (e.g., an Identification Provider, as generally known in the art) 122. As such, the first device 102 can also be operable to effectively register the first entity 110 with an identification assigning entity in order to obtain the authentication identifiers before storing them in the storage 112. The first device 102 can be operable to communicate directly with the third entity 122 and/or via the connection 114 through the second device 106. Broadly speaking, receiving a service can include receiving and/or accessing data, receiving and/or accessing servicing data (e.g., content), receiving a service, approving and/or completing a transaction (e.g., a business transaction, transaction for purchase), and/or approving or completing a business transaction for purchases of goods and services.

As an example, in electronic commerce (or e-commerce), typically a service provider (e.g., a .com entity) authenticates an entity before services are provided. A service can be in the form of digital data (e.g., a song, a movie) purchased or effectively complete a business transaction for delivery of physical goods (e.g., a book, groceries). Given the prevalence of e-commerce and the difficult challenges of Identity Management, techniques that are especially useful for Identity Management and e-commerce will be discussed in greater detail. However, it will readily be appreciate that the techniques of the invention can be applied in various authentication applications, and more generally for accessing a device (e.g., 104a) for any purpose, as invention does not make any specific assumptions regarding the authentication techniques, devices, or the services that are provided by a device.

Figure 1B:
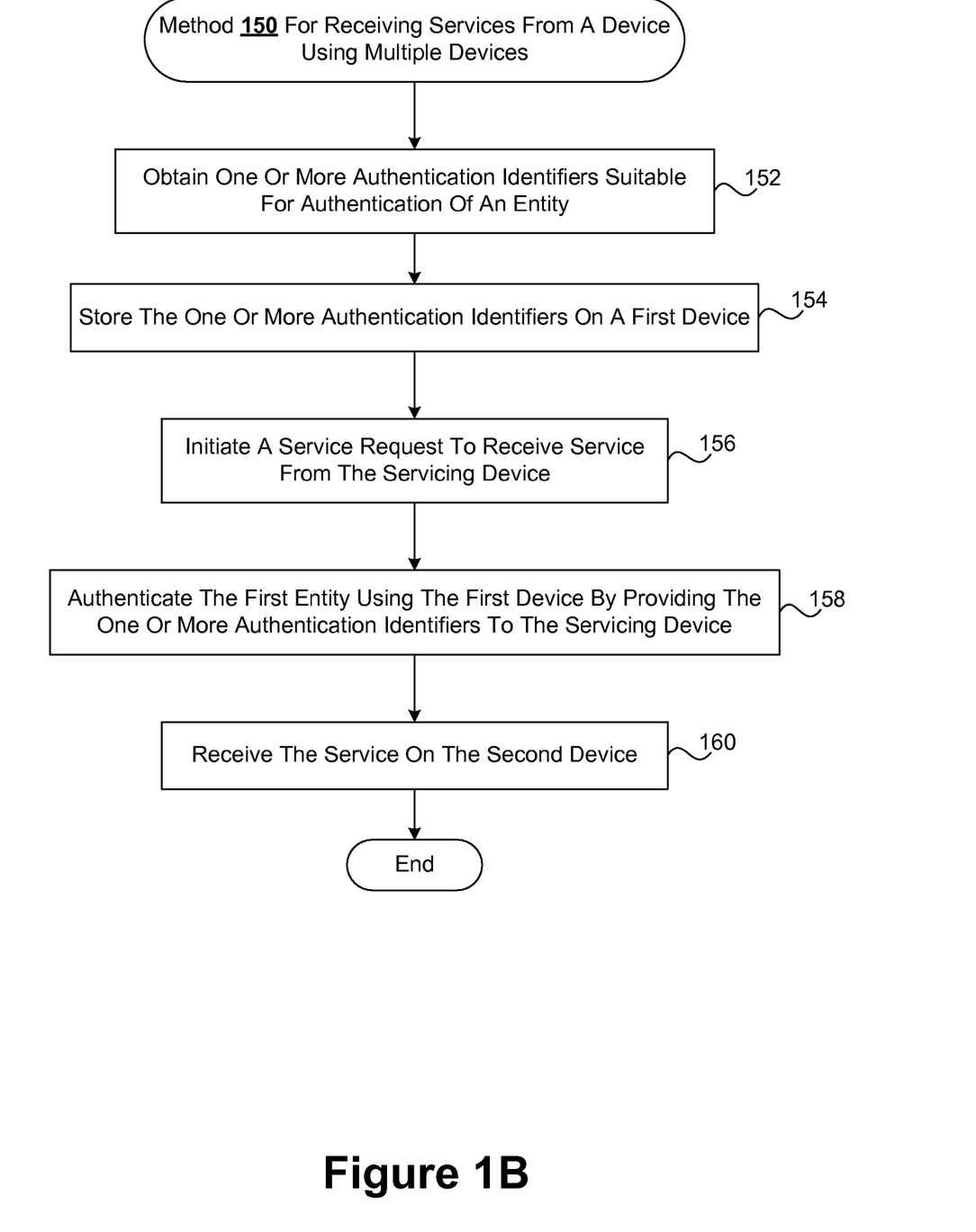
FIG. 1B depicts a method for receiving services from a device using multiple devices in accordance with one embodiment of the invention.

FIG. 1B depicts a method 150 for receiving services from a device using multiple devices in accordance with one embodiment of the invention. Method 150 can, for example, be used in the communication environment 100 by using the first and second devices 102 and 106 depicted in FIG. 1A. Referring to FIG. 1B, initially, one or more authentication identifiers are obtained (152). The one or more authentication identifiers are suitable for authentication of an entity by a servicing device in order to receive services from the serving device. Next, the one or more authentication identifiers are stored on the first device. Typically, the first device provides a relatively safer environment for storing the one or more authentication identifiers than a second device which can be used to receive the services from the serving device. Referring back to FIG. 1B, a service request is initiated (156) in order to receive services from the serving device. Typically, the service request is initiated by the second device which is more suitable or preferred for initiating the services. After the service request has been initiated (156), the first entity is authenticated (158) using the first device. The first device can effectively authenticate the first entity by providing the one or more authentication identifiers to the serving device. After authenticating (158) of the first entity, the service requested by the service request is received on the second device (156), and the method 150 ends. As noted above, the second device can be better suited and/or more preferred for receiving and/or using the service and the first device used for authentication can be a more secure device.

Figure 1C:
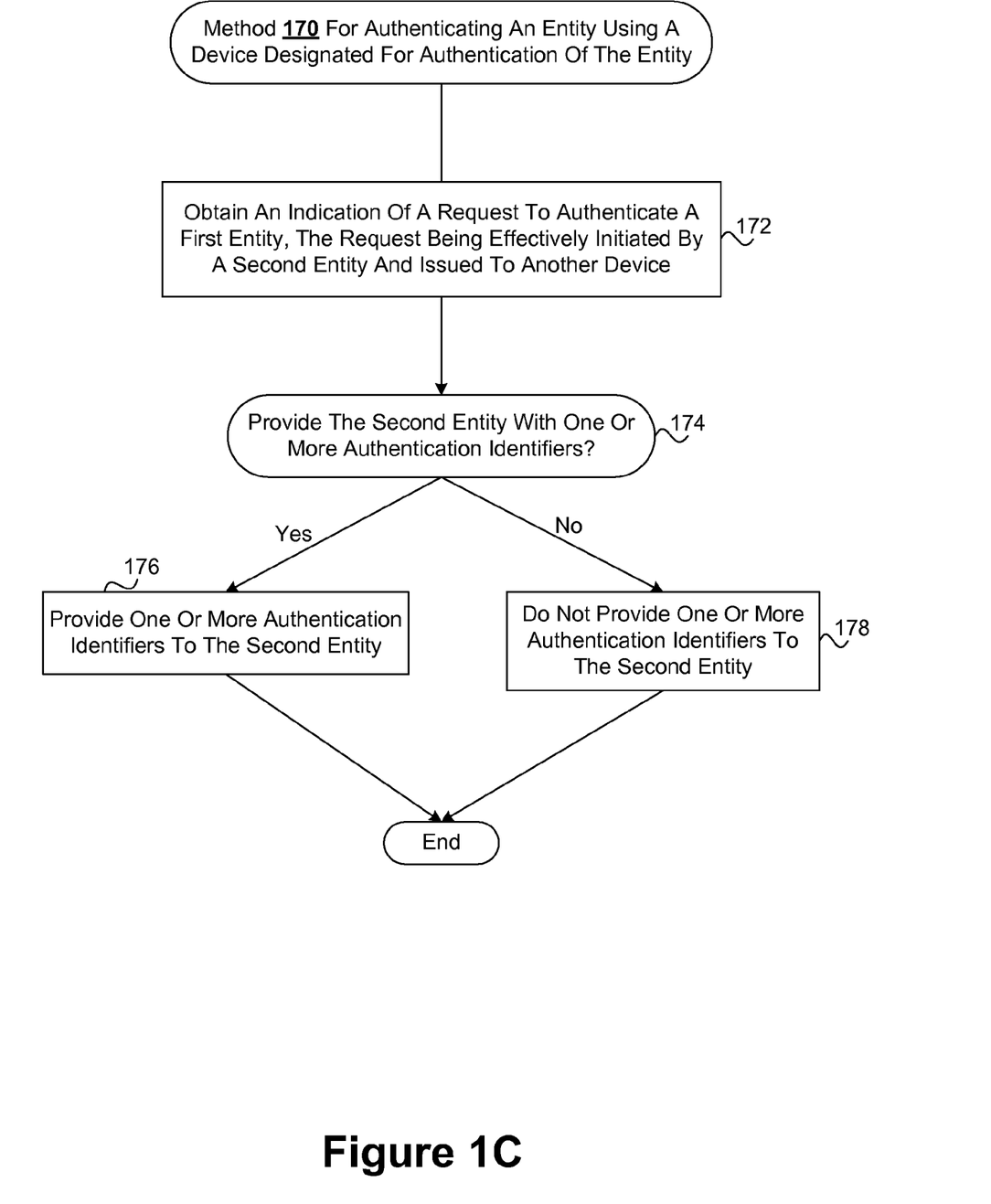
FIG. 1C depicts a method for authenticating an entity using an device designated for authentication of the entity in accordance with one embodiment of the invention.

FIG. 1C depicts a method 170 for authenticating an entity using an device designated for authentication of the entity in accordance with one embodiment of the invention. The method 170 can, for example, represent in greater detail the authentication operation (158) of FIG. 1B. Referring now to FIG. 1C, initially, at least an indication of a request to authenticate the first entity is obtained (172). In other words, an indication of the request and/or the request itself can be obtained. Generally, an indication can include data (e.g., an address) that can be used to effectively identify and/or obtain the request for authentication. It should be noted that a request to authenticate a first entity is typically initiated by a second entity and can be issued to another device, (i.e., a device that is not designated for authentication of the entity but may be used for receiving the service). Based on the indication of the request to authenticate the first entity, it is determined (174) whether to provide the second entity with one or more authentication identifiers. Accordingly, one or more authentication identifiers can be provided (176) to the second entity if it is determined (174) to provide the one or more authentication identifiers to the entity. However, if it is determined (174) not to provide an authentication identifier to the second entity, the authentication identifier is not provided to the second entity, and the method 170 ends. It should be noted that the determining (174) whether to provide the second entity with one or more authentication identifiers can effectively be made based on the first entity's willingness to release that one or more authentication identifiers to the second entity. By way of example, as the first entity, a person as who is being authenticated can provide input in real time to acknowledge his or her willingness to release particular authentication identifier. In other words, the person being authenticated can decide whether to release or not to release his or her personal identification (e.g., credentials including credit card number, bank account, social security number). As another example, various preferences and rules can be used to determine the person's willingness and/or authorization to release an authentication identifier to the second entity. The method 170 ends after providing (176) or refusal to provide (178) the one or more authentication identifiers t the second entity.

Figure 2A:
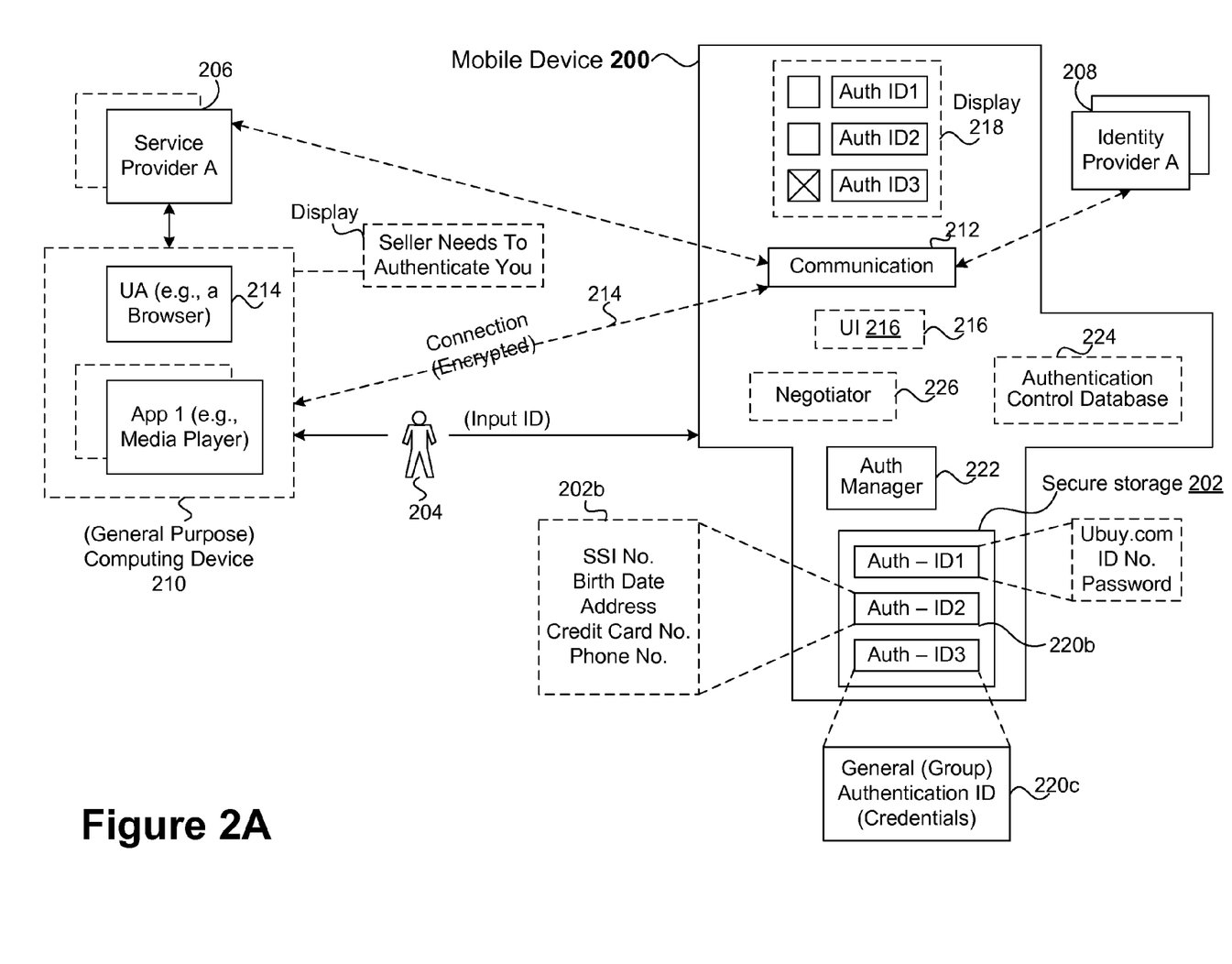
FIG. 2A depicts a mobile device in accordance with one embodiment of the invention.

FIG. 2A depicts a mobile device 200 in accordance with one embodiment of the invention. The mobile device 200 can effectively provide a secure storage 202 for storing one or more authentication identifiers which can be used to authenticate one or more persons 204, thereby allowing the one or more persons 204 to carry the data needed for authentication for various purposes including receiving services from one or more Service Providers 206. It will also be appreciated that the mobile device 200 can be designated for registering with one or more Identity Providers 208. In other words, the mobile device 200 can be used for registering one or more persons 204 with Identity Providers 208 and also used for authentication of the one or more persons 204 with the service providers 206. It should be noted that the mobile device 200 can also be operable to provide additional functionality. In particular, it will be appreciated that the mobile device 200 can be a Smartphone and/or a cellular phone (cell phone). As will be known to those skilled in the art, a Smartphone and/or cell phone can generally provide a safer computing environment than a computing device (or system) 210 (e.g., a general purpose personal computer). However, the computing system 210 can be more preferred or better suited for receiving and/or using the services offered by a service provider 206. In general, the mobile device 200 can effectively provide a relatively safer environment for storing the authentication identifiers and/or safer mechanisms for registering and authenticating the one or more persons 204 than the computing device 210.

Referring back to FIG. 2A, the mobile device 200 can effectively communicate via a communication component (or module) 212 to the Identity Providers 208 in order to register the one or more persons 204 and obtain one or more authentication identifiers before storing them in the secure storage 202. By way of example, the mobile device 200 can be a cell phone which has its own connectivity (e.g., by using a GSM-GPRS or WiFi connection). As another example, mobile device 200 can be operable to communicate with the Identity Providers via a connection 214 through the computing device 210. The connection 214 can, for example, be a USB or a Bluetooth connection. In general, those skilled in the art will appreciate that a secure channel can be effectively built between the mobile device 200 and Identity Providers 208 in order to transmit registration data and obtain the authentication identifiers. Data including registration data and authentication identifiers may be encrypted and/or secured via the connection 214 using various encryption mechanisms (e.g., by suing private keys, secret keys, passwords).

After registering with the Identity Providers 208, one or more authentication identifiers can be obtained from the identity providers 208, stored in the security storage 202, and subsequently used to authenticate the one or more persons 204 with the Service Providers 206 in response to service requests. It will be appreciated that a service request can be initiated by the general purpose computing system 210. Generally, the mobile device 200 can also be operable to provide an authentication identifier to a Service Provider 206 in a secure manner. In particular, it will be appreciated that a Smartphone or cell phone which can provide its own connectivity to the service provider 206 can offer a more secure solution for transmitting an authentication identifier than one that uses the computing device 210 for connection to a Service Provider. However, if direct communication is not possible or not desired, the connection 214 can be used to effectively transmit an authentication identifier to a Service Provider 206. A secure communication channel can effectively be made, for example, by using the "public key certificate" of the mobile device 200 in order to transmit the authentication identifier to the service provider in a secure manner. In addition, security mechanisms provided in a cell phone can effectively protect the authentication identifiers including various credentials (e.g., credit card numbers, bank account) of a person 204. It should be noted that the Identity Provider 208 and the mobile device 200 can use various encryption mechanisms in order to effectively encrypt the authentication identifiers including credentials of the person 204. As such, encrypted authentication identifiers can be stored on the mobile device 200 and transmitted in an encrypted form to the Service Providers 206. Encrypted authentication identifiers can be transmitted to the Service Providers 206 without building a secure channel between the mobile device 200 and the Service Providers 206. A Service Provider 206 can be operable to build a secure channel with an Identity Provider 208 which can transmit to the Service Provider 206 a decrypted authentication identifier. The mobile device 200 can be operable to initiate and use its own connection mechanism for connecting to the Service Providers 206 and/or Identity Providers 208. The computing device 210 can be operable to effectively redirect an authentication challenge (or request for authentication) to the mobile device 200, for example, by using a HTTP redirect mechanism.

Referring again to FIG. 2A, a user agent (e.g., a browser) 214 can be used by the one or more persons 204 in order to initiate a request for service from a Service Provider 206. By way of example, a user 204 can browse various websites and locate an item from a merchant and initiate a request for purchasing this item (e.g., place an item in a "shopping cart" and initiate the purchasing process). In response to this request for purchase, the service provider 206 effectively issues a request for authentication of the user (or an authentication challenge). By way of example, the person can be asked to provide his or her name, address and credit card information. However, rather than authenticating the person on a computing device 210, the user 204 can use the mobile device 200 in order to authenticate his or her identity and/or provide credentials needed for receiving the services from the service provider 206. More particularly, at least an indication of the request for authentication can be provided to the mobile device 200. By way of example, this indication can be data transmitted via the connection 214 from the computing system 210 to the mobile device 200. As another example, an address or reference to the Service Provider and/or the Service Request (e.g., an URL to the merchant and/or the shopping cart of the person 204) can be known and entered by the person 204 using a UI interface 216 of the mobile device 200. Generally, the computing system 210 and the mobile device 200 can be synchronized either automatically or via interaction by the person 204 to complete the request for the services on mobile device 200 even though the request is initiated by the computing device 210. In any case, the request for authentication issued by the Service Provider 206 can be effectively used to identify one or more authentication identifiers which are requested by the Service Provider 206 and/or can be offered. It is also possible to only consider the authentication identifiers that are available regardless of what has been requested by the Service Provider 206. In any case, the person 204 can be prompted to determine whether to release an authentication identifier to a Service Provider 206. By way of example, the service provider 206 may effectively request authentication by providing personal information depicted as authentication identifier 220b. However, the person 204 may not want to release that information to the service provider 206. As such, based on input provided by the person 204, an authentication manager 222 effectively may not allow the release of the authentication identifier. It will be appreciated that the person 204 can, for example, interact with the mobile device 200 in real time using the User Interface (UI) (216) and the display (218). As another example, various predefined preferences and/or rules can be stored in authentication control database 224 and used to determine whether to release or not to release an authentication identifier to a Service Provider 206. The authentication control database 224 may also optionally store historical data in order to, for example, effectively "learn" the user's preferences and/or requirements regarding release of the predefined authentication identifiers. As another example, a negotiator 226 may be operable to ultimately negotiate the release of an authentication identifier 220c pertaining to a general authentication ID (e.g., credential established through a third trusted party, such as, for example, PayPal as generally known today).

Figure 2B:
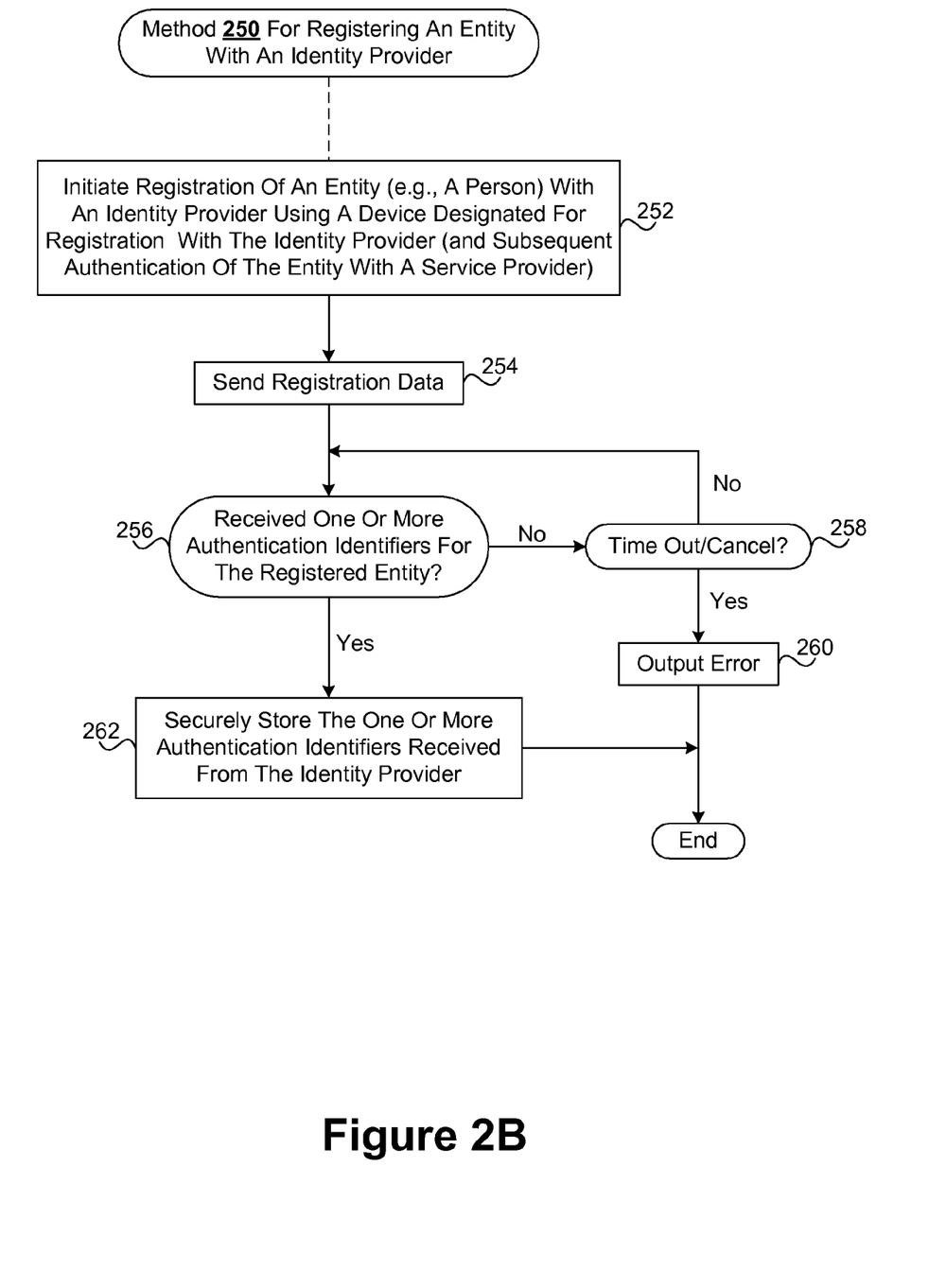
FIG. 2B depicts method for registering an entity with an Identification Provider in accordance with one embodiment of the invention.

FIG. 2B depicts method 250 for registering an entity with an Identification Provider in accordance with one embodiment of the invention. One or more operations from the method 250 can, for example, be performed by the mobile device 200 depicted in FIG. 2A. Referring to FIG. 2B, initially, registration of an entity (e.g., a person) with an Identity Provider is initiated (252). It should be noted that the registration of the entity is initiated (252) using a device designated for registration of the entity with the Identity Provider. The device may also be designated for authentication of (or authenticating) the entity with a Service Provider. As a part of the registration process, registration data may be sent (254) before it is determined (256) whether one or more registration identifiers are received (256). In other words, it can be determined (256) whether the registration process has successfully completed to effectively register the first entity with the Identity Provider. Typically, the one or more authentication identifiers can be received by the device designated for registration of the entity with the Identity Provider. If it is determined (256) that the one or more authentication identifiers are not received, an error can be output (260), and the method 250 can end as a result of, for example, a time out and/or cancellation (258). On the other hand, if it is determined that one or more authentication identifiers have been received (256), the one or more authentication identifiers are securely stored (262). By way of example, the authentication identifiers can be stored in a secure storage of the device used or designated for registration in a secure storage provided by the device designated for registration of the entity with identity provider before the method 250 ends.

Figure 2C:
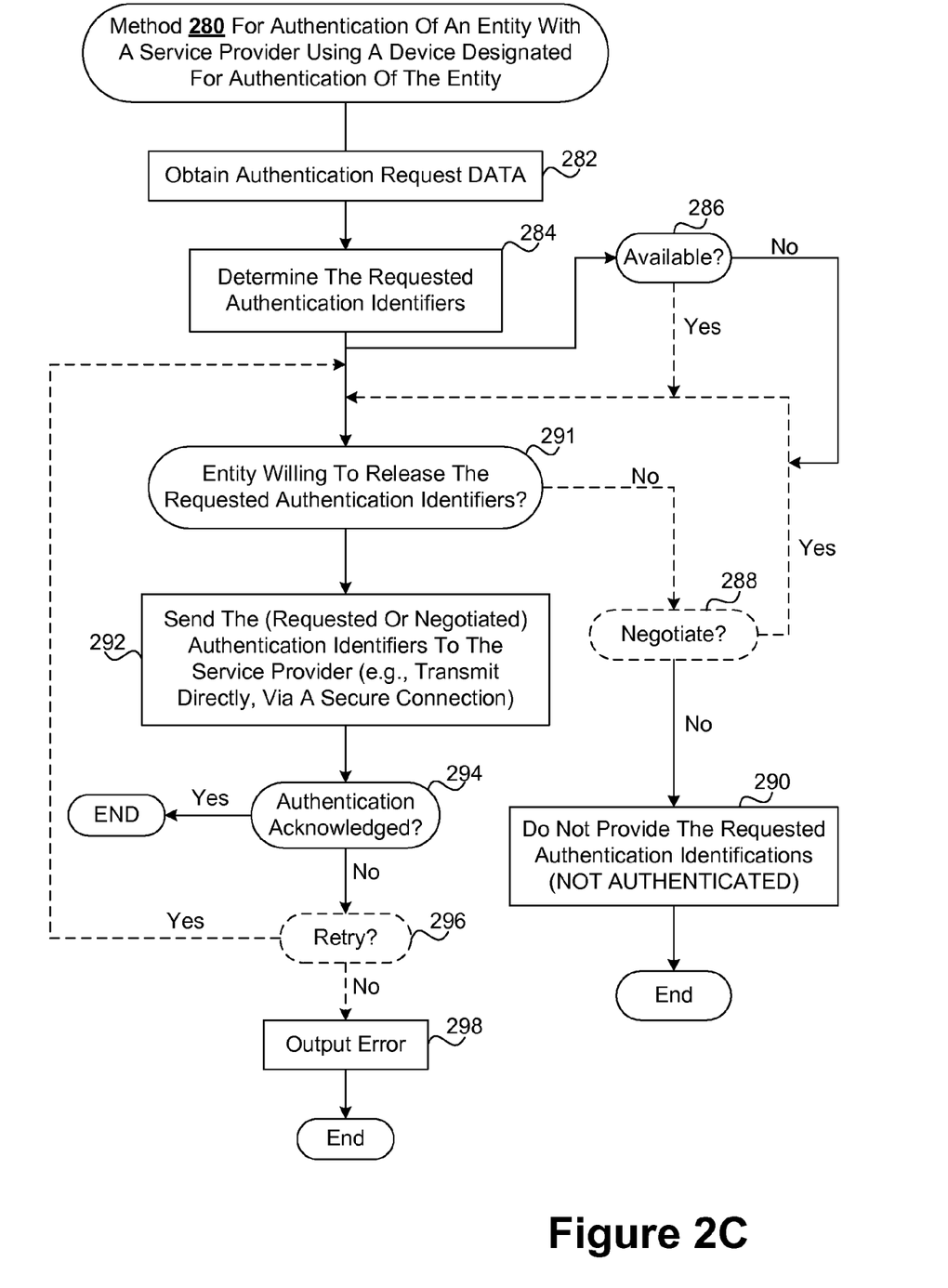
FIG. 2C depicts a method for authentication of an entity with a Service Provider using a device designated for authentication of the entity in accordance with one embodiment of the invention.

As noted above, a device may be designated for both registering an entity with an Identity Provider and authentication of that entity with a Service Provider. To further elaborate, FIG. 2C depicts a method 280 for authentication of an entity with a Service Provider using a device designated for authentication of the entity in accordance with one embodiment of the invention. One or more operations of the method 280 can, for example, be performed by the mobile device 200 depicted in FIG. 2A. As such, a device designated for authentication of the entity can also be designated for registration of that entity. However, it should be noted that the registration may be performed by another device and the authentication identifiers can, for example, be transferred to the device designated for authentication of the entity. Referring to FIG. 2C, initially, authentication request data is obtained (282). The authentication request data can pertain to a request for authentication of the entity and may effectively be used to identify one or more identification identifiers which are requested by the Service Provider for authentication of the entity. As such, based on the authentication request data, one or more authentication identifiers can be determined (284). Typically, the one or more authentication identifiers represent one or more credentials that the Service Provider can request to authenticate the entity. Next, it is determined whether the one or more requested authentication identifiers are available by the device. The one or more authentication identifiers can, for example, be stored, secured and/or controlled by the device designated for authentication of the entity. Typically, it may be more feasible to store the one or more authentication identifiers on the device itself. If it is determined (286) that the requested authentication identifier is not available, it may optionally be determined (288) whether an alternative authentication identifier can be negotiated. If it is determined (288) that an alternative authentication identifier cannot be negotiated, the first entity is not authenticated (290), and the method 280 ends. Generally, the method 280 can end if it is determined that a requested authentication identifier is not available. On the other hand, if it is determined (286) that the one or more requested authentication identifiers are available, it is determined (291) whether the entity is willing to release (or has authorized the release) of the requested one or more authentication identifiers. Determining (291) of the willingness of the entity to release authentication identifier can, for example, be made based on a input provided by a person, rules, and/or preferences which may be stored on the device. In any case, if it is determined (291) that the entity is not willing to release an authentication identifier, it may be determined whether an alternative authentication identifier can be negotiated (288). As such, an alternative authentication identifier may be negotiated and sent to the Service Provider (292). Generally, if it is determined (291) that the entity is willing to release one or more authentication identifiers, the one or more authentication identifiers are provided (292) to the Service Provider (292). By way of example, an authentication identifier can be transmitted directly to a Service Provider and/or via a secure connection made through another device. After sending (292) the one or more authentication identifiers to the Service Provider, an acknowledgment can be received (294). Optionally, authentication process may be retried (296). After one or more attempts (296), the method 280 can end after successful authentication or as a result of failure to receive an acknowledgment of the authentication resulting in an error to be output (298).

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A device that is a mobile telecommunications device comprising:
    a wireless communication module, a display, and a local memory, wherein said device is configured to:
    obtain an indication on the device of a request to authenticate a first entity, wherein said request to authenticate has been effectively initiated by a service provider associated with a servicing device and issued to a second device in order to authenticate said first entity, wherein said first entity includes one or more persons;

determine, based on selectable preferences of the user of the device, a selection of authentication identifiers the entity is willing to be provided to the servicing device and using the selection to determine whether to effectively provide one or more authentication identifiers from a set of authentication identifiers including a general authentication ID and at least one personal identification that are stored in the local memory on said device to said servicing device for authentication of said first entity in response to said request to authenticate said entity; and effectively provide said one or more authentication identifiers to said servicing device only when said determining determines to effectively provide said one or more authentication identifiers to said first entity, thereby allowing said servicing device to authenticate said first entity based on said authentication identifiers stored on said device even though said request to authenticate said first entity was effectively issued to said second device;

wherein the device stores authentication identifiers on the behalf of the second device and permits the user of the device to determine preferences for the release of identification information to service providers;

wherein said device provides authentication management, including determining user preferences for releasing authentication identifiers based on historical usage of the device.

2. The device of claim 1, wherein said wherein the device includes at least one of a secure storage area and encryption to protect authentication identifiers and one or more authentication identifiers are not stored on said second device, including at least one personal identification selected from the group consisting of a social security number, credit card number, password, address, phone number, date of birth, and website ID number and said determining including identifying which subset of authentication identifiers to provide.

3. The device of claim 1, further comprising receiving one or more inputs from the user of the device to determine the preferences of the first entity regarding said first entity's willingness to allow or not allow said one or more authentication identifiers to be provided to said servicing device, wherein a subset of authentication identifier is identified from the set of authentication identifiers.

4. The device of claim 1,
wherein the device provides a trusted computing environment and includes at least one of a secure storage area and encryption to protect authentication.

5. The device of claim 1, wherein said servicing device effectively represents a Service Provider.

6. The device of claim 1,
wherein said indication of said request for authentication effectively identifies said one or more authentication identifiers as one or more authentication identifiers that have been requested by said second entity; and
wherein said determining of whether to effectively provide said one or more authentication identifiers to said servicing device comprises: determining whether said one or more authentication identifiers are among one or more releasable authentication identifiers from the set of authentication identifiers that have been generally authorized by said first entity for general release and/or specifically authorized for release to said second entity.

7. The device of claim 1, further comprising:
prompting a person for release of said one or more authentication identifiers as one or more authentication identifiers that have been requested by a servicing entity effectively represented by said servicing device; and
receiving input from said person input indicative of said person's authorization and/or willingness to release said one or more authentication identifiers to said Service Provider.

8. The device of claim 1, wherein said one or more authentication identifiers are securely stored on said device in a secure storage of said device.

9. The device of claim 1, wherein said device is relatively more secure than said second device, thereby allowing said one or more authentication identifiers to be better protected than they would be if stored on said second device.

10. The device of claim 1, wherein said indication of said request to authenticate said first entity includes authentication request data and/or a reference to authentication request data effectively allowing identification of said one or more authentication identifiers as one or more authentication identifiers that have been requested by said servicing device.

11. The device of claim 10, wherein said authentication request data and/or said reference to authentication request includes a Universal Resource Locator (URL).

12. The device of claim 1, wherein said device is further operable to receive said one or more authentication identifiers from an identity assigning device effectively representing an identity assigning entity.

13. The device of claim 11,
wherein said identity assigning entity can effectively issue said one or more authentication identifiers to said first entity, and
wherein said device is further operable to:
register said entity with said identity assigning entity to receive said one or more authentication identifiers.

14. The device of claim 11, wherein said identity assigning entity includes an Identity Provider.

15. A device that is a mobile telecommunications device comprising a wireless communication module, a display, and a local memory, wherein said device is configured to:
obtain an indication on the device of a request to authenticate a first entity, wherein said request to authenticate has been effectively initiated by a service provider associated with a servicing device and issued to a second device in order to authenticate said first entity, wherein said first entity includes one or more persons;
determine, based on selectable preferences of the user of the device, a selection of authentication identifiers the entity is willing to be provided to the servicing device and using the selection to determine whether to effectively provide one or more authentication identifiers from a set of authentication identifiers including a general authentication ID and at least one personal identification that are stored in the local memory on said device to said servicing device for authentication of said first entity in response to said request to authenticate said entity; and
effectively provide said one or more authentication identifiers to said servicing device only when said determining determines to effectively provide said one or more authentication identifiers to said first entity, thereby allowing said servicing device to authenticate said first entity based on said authentication identifiers stored on said device even though said request to authenticate said first entity was effectively issued to said second device;
wherein the device stores authentication identifiers on the behalf of the second device and permits the user of the device to determine preferences for the release of identification information to service providers;

wherein said device is further configured to negotiate release of authentication information through a trusted external entity.

16. The device of claim 1, wherein said mobile device is a mobile phone and/or a Smartphone.

17. The device of claim 16, wherein said mobile device is operable to directly connect to said servicing device.

18. The device of claim 1, wherein said effectively providing said one or more authentication identifiers to said servicing device comprises one or more of the following:
using a secure connection to send said one or more authentication identifiers to said servicing device,
using a secure connection made via said second device to send said one or more authentication identifiers to said servicing device,
using said second device to send said one or more authentication identifiers to said servicing device,
encrypting said one or more authentication identifiers,
sending encrypted data to said servicing device,
sending encrypted data to said servicing device via said second device,
not sending the one or more authentication identifiers via said second device, and
sending said one or more authentication identifiers directly to said servicing device.

19. A method for authenticating a first entity using a first device that is a mobile telecommunications device, said method comprising:
obtaining, at the first device, an indication of a request to authenticate a first entity, wherein said request to authenticate has been effectively initiated by a servicing device and issued to a second device in order to authenticate said first entity;
determining, at the first device, whether to effectively provide said one or more authentication identifiers from a set of authentication identifiers that are securely stored on said first device to said servicing device for authentication of said first entity in response to said request to authenticate said first entity, including:
prompting a user of the first device for release of said one or more authentication identifiers to the servicing device; and
receiving input from said user, the input indicating said user's authorization and/or willingness to release said one or more authentication identifiers to a service provider associated with the servicing device; and
effectively providing, from the first device, said one or more authentication identifiers to said servicing device only when said determining determines to effectively provide said one or more authentication identifiers from a set of authentication identifiers including a general authentication ID and at least one personal identification to said first entity, thereby allowing said servicing device to authenticate said first entity based on said authentication identifiers stored on said first device even though said request to authenticate said first entity was issued to said second device;
wherein a user of the first device may select whether to release different types of authentication identification information from said first device to said servicing device on the behalf of said second device;
the method further comprising providing authentication management, including determining user preferences for releasing authentication identifiers based on historical usage of the first device.

20. A method of receiving services from a servicing device, wherein said method comprises:
obtaining a set of authentication identifiers including a general authentication ID and at least one personal identification suitable for authentication of a first entity;
storing said set of authentication identifiers on a first device;
initiating a service request to receive service from said servicing device;
receiving a request for authentication of said first entity in response to said service request;
authenticating said first entity using said first device by effectively providing one or more authentication identifiers to said serving device required to perform authentication based on user preferences regarding what authentication identification information the user of the first device is willing to provide to a service provider; and
receiving said service on a second device after said authenticating of said first entity by using said first device;
the method further comprising providing authentication management, including determining user preferences for releasing authentication identifiers based on historical usage of the first device.

21. The method of claim 20, wherein said service includes one or more of the following: receiving and/or accessing data, receiving and/or accessing servicing data, receiving a service, approving and/or completing a transaction, approving and/or completing a business transaction, approving and/or completing a business transaction for a purchase, approving and/or completing a business transaction for purchasing a goods or a service.

22. The method of claim 20, wherein said first device is relatively safer and/or more secure for storing said one or more authentication identifiers than said second device.

23. The method of claim 20,
wherein said second device is relatively more capable and/or more preferred for receiving and/or using said service, and
wherein said method further comprises: using said services on said second device.

24. The method of claim 20,
wherein said servicing entity is a Service Provider, and
wherein said first entity being authenticated includes one or more persons being authenticated for receiving said service.

25. The method of claim 20, wherein said obtaining of said one or more authentication identifiers comprises: obtaining said one or more authentication identifiers by said first device.

26. The method of claim 20,
wherein said second device initiates said service request on said second device; and
wherein said second device receives said request for authentication of said first entity.

27. The method of claim 20,
wherein said first entity obtains said one or more authentication identifiers from an identity assigning entity that effectively assigns said one or more one or more authentication identifiers to said first entity.

28. The method of claim 20, wherein said providing of said one or more authentication identifiers comprises one or more of the following:
providing, by said first device, one or more authentication identifiers directly to said providing said one or more authentication identifiers;

providing, by said first device, one or more authentication identifiers via said second device to said providing said one or more authentication identifiers; and providing, by said first device, one or more authentication identifiers via another device to said providing said one or more authentication identifiers.

29. The method of claim 20, wherein said identity assigning entity includes an Identifier Provider.

30. The method of claim 20, wherein said first device is operable to independently control said authenticating of said first entity using said one or more authentication identifiers stored on said first device.

31. The mobile device of claim 1, wherein the mobile device has a mode of operation in which it directs communication authentication information to the service provider without routing the authentication information through the second device.

32. The mobile device of claim 1, wherein a user interface on the mobile device prompts the user to authorize release of authentication identification information requested by the service provider.

33. The device of claim 15, wherein said wherein the device includes at least one of a secure storage area and encryption to protect authentication identifiers and one or more authentication identifiers are not stored on said second device, including at least one personal identification selected from the group consisting of a social security number, credit card number, password, address, phone number, date of birth, and website ID number and said determining including identifying which subset of authentication identifiers to provide.

34. The device of claim 15, further comprising receiving one or more inputs from the user of the device to determine the preferences of the first entity regarding said first entity's willingness to allow or not allow said one or more authentication identifiers to be provided to said servicing device, wherein a subset of authentication identifier is identified from the set of authentication identifiers.

35. The device of claim 15,
wherein the device provides a trusted computing environment and includes at least one of a secure storage area and encryption to protect authentication.

36. The device of claim 15, wherein said servicing device effectively represents a Service Provider.

37. The device of claim 15,
wherein said indication of said request for authentication effectively identifies said one or more authentication identifiers as one or more authentication identifiers that have been requested by said second entity; and
wherein said determining of whether to effectively provide said one or more authentication identifiers to said servicing device comprises: determining whether said one or more authentication identifiers are among one or more releasable authentication identifiers from the set of authentication identifiers that have been generally authorized by said first entity for general release and/or specifically authorized for release to said second entity.

38. The device of claim 15, further comprising:
prompting a person for release of said one or more authentication identifiers as one or more authentication identifiers that have been requested by a servicing entity effectively represented by said servicing device; and
receiving input from said person input indicative of said person's authorization and/or willingness to release said one or more authentication identifiers to said Service Provider.

39. The device of claim 15, wherein said one or more authentication identifiers are securely stored on said device in a secure storage of said device.

40. The device of claim 15, wherein said device is relatively more secure than said second device, thereby allowing said one or more authentication identifiers to be better protected than they would be if stored on said second device.

41. The device of claim 15, wherein said indication of said request to authenticate said first entity includes authentication request data and/or a reference to authentication request data effectively allowing identification of said one or more authentication identifiers as one or more authentication identifiers that have been requested by said servicing device.

42. The device of claim 41, wherein said authentication request data and/or said reference to authentication request includes a Universal Resource Locator (URL).

43. The device of claim 15, wherein said device is further operable to receive said one or more authentication identifiers from an identity assigning device effectively representing an identity assigning entity.

44. A method for authenticating a first entity using a first device that is a mobile telecommunications device, said method comprising:
obtaining, at the first device, an indication of a request to authenticate a first entity, wherein said request to authenticate has been effectively initiated by a servicing device and issued to a second device in order to authenticate said first entity;
determining, at the first device, whether to effectively provide said one or more authentication identifiers from a set of authentication identifiers that are securely stored on said first device to said servicing device for authentication of said first entity in response to said request to authenticate said first entity, including:
prompting a user of the first device for release of said one or more authentication identifiers to the servicing device; and
receiving input from said user, the input indicating said user's authorization and/or willingness to release said one or more authentication identifiers to a service provider associated with the servicing device; and
effectively providing, from the first device, said one or more authentication identifiers to said servicing device only when said determining determines to effectively provide said one or more authentication identifiers from a set of authentication identifiers including a general authentication ID and at least one personal identification to said first entity, thereby allowing said servicing device to authenticate said first entity based on said authentication identifiers stored on said first device even though said request to authenticate said first entity was issued to said second device;
wherein a user of the first device may select whether to release different types of authentication identification information from said first device to said servicing device on the behalf of said second device;
wherein said method further comprises negotiating release of authentication information through a trusted external entity.

45. A method of receiving services from a servicing device, wherein said method comprises:
obtaining a set of authentication identifiers including a general authentication ID and at least one personal identification suitable for authentication of a first entity;
storing said set of authentication identifiers on a first device;

initiating a service request to receive service from said servicing device;

receiving a request for authentication of said first entity in response to said service request;

authenticating said first entity using said first device by effectively providing one or more authentication identifiers to said serving device required to perform authentication based on user preferences regarding what authentication identification information the user of the first device is willing to provide to a service provider; and receiving said service on a second device after said authenticating of said first entity by using said first device;

wherein said method further comprises negotiating release of authentication information through a trusted external entity.

* * * * *